Dec. 29, 1925.
W. C. BAKELS
1,567,892
TOOL FOR REMOVING FROM OR APPLYING DIFFERENTIAL GEARS TO THEIR AXLES
Filed Sept. 20, 1924
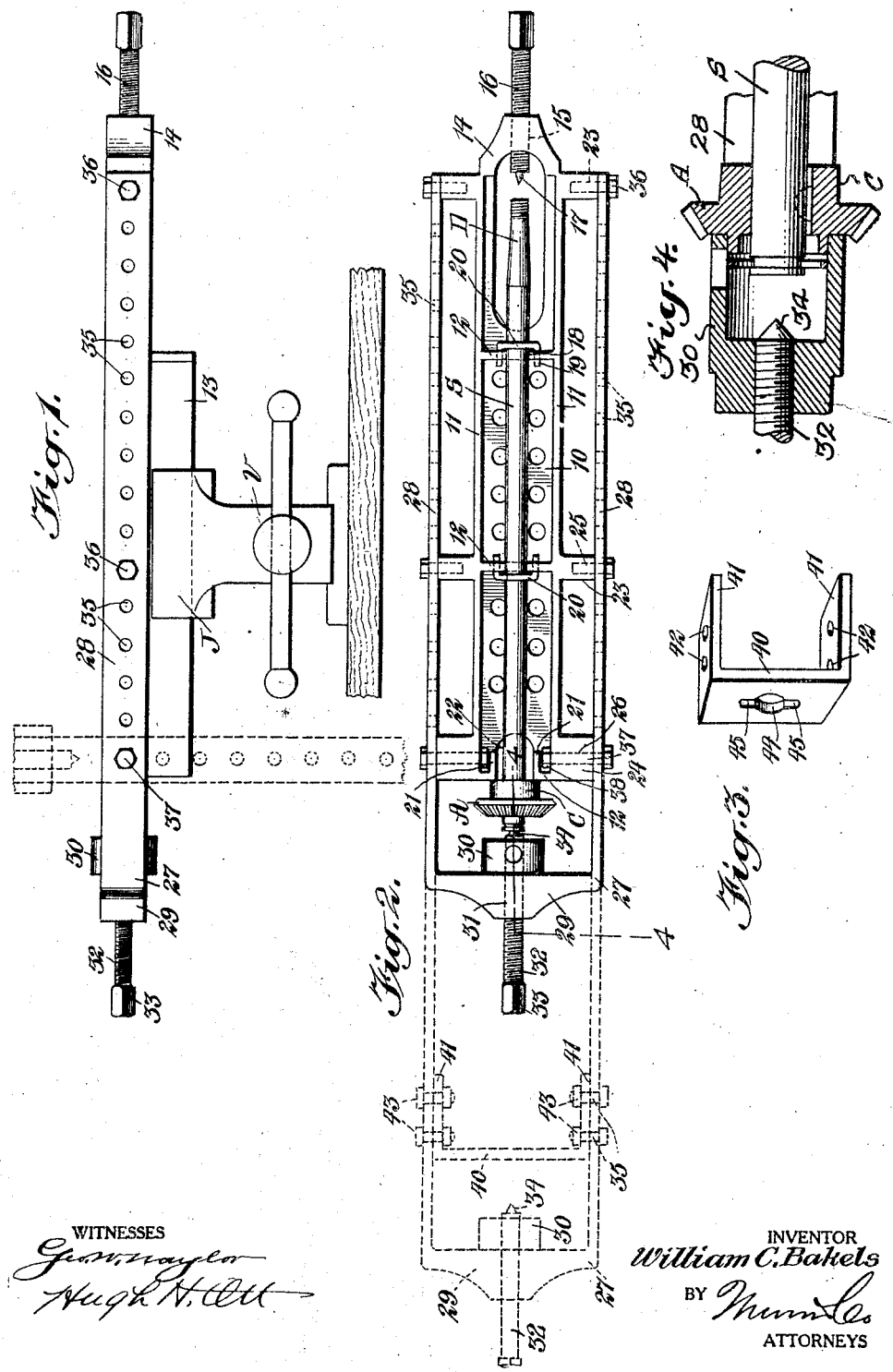
WITNESSES
INVENTOR
William C. Bakels
BY
ATTORNEYS Patented Dec. 29, 1925.

1,567,892

UNITED STATES PATENT OFFICE.

WILLIAM C. BAKELS, OF MIDLAND PARK, NEW JERSEY.

TOOL FOR REMOVING FROM OR APPLYING DIFFERENTIAL GEARS TO THEIR AXLES.

Application filed September 20, 1924. Serial No. 738,856.

*To all whom it may concern:*

Be it known that I, WILLIAM C. BAKELS, a citizen of Holland, and resident of Midland Park, in the county of Berger and State of New Jersey, have invented a new and Improved Tool for Removing from or Applying Differential Gears to Their Axles, of which the following is a full, clear, and exact description.

This invention relates to tools and has particular reference to a tool which is especially designed for facilitating the application of differential gears to or the removal of said gears from their axles, the same being an improvement over a prior device as set forth in United States Letters Patent No. 1,463,031 granted July 24, 1923.

The device set forth in the prior patent, was necessarily limited to use in connection with axles of practically one standard length and hence it is one of the principal objects of the present invention to improve the tool whereby a wide range of adjustment is afforded in order that the same may be employed in connection with axles of practically any standard length.

Furthermore the invention comprehends a tool provided with means rendering the same capable of adjustment to operate in a vertical as well as a horizontal position, thereby adapting the same to many other uses and purposes.

Further objects of the invention reside in the simplicity of its construction, the economy in its manufacture and efficiency of its use.

With the above recited and other objects in view, the invention resides in the novel construction set forth in the following specification, particularly pointed out in the appended claims and illustrated in the accompanying drawings, it being understood that the right is reserved to embodiments other than those actually illustrated herein, to the full extent indicated by the general meaning of the terms in which the claims are expressed.

In the drawings—

Figure 1 is a side elevation of a tool constructed in accordance with the invention.

Fig. 2 is a top plan view thereof illustrating its use.

Fig. 3 is a detail perspective view of a removable attachment therefor.

Fig. 4 is an enlarged fragmentary longitudinal sectional view taken approximately on the line 4—4 of Fig. 2.

Referring to the drawings by characters of reference the tool comprises a stationary member 10 preferably in the nature of a casting provided with upstanding side marginal flanges 11 and spaced transverse marginal flanges 12. The member 10 is further provided with a depending rib 13 adapted to be clamped between the jaws J of a suitable vise V. The tail end of the member 10 is formed with a bearing 14 having a threaded bearing opening 15 disposed axially of the member 10 through which the threaded shank of a screw 16 extends, said shank being provided at its inner end with a conical or pointed extremity 17. The transverse flanges 12 of the member 10 are provided with bearing recesses 18 for supporting a shaft S in axial alinement with the screw 16 and said flanges 12 at opposite sides of the recess are provided with openings for receiving the legs 19 of the retaining clip member 20 which partially embrace the shaft for holding the same against upward movement in the bearing recesses 18. At the head end of the member 10 the transverse flange 12 is cut away and provided with rearwardly directed portions 21 disposed in spaced parallel relation to the side flanges 11. The base of the member 10 at this point is also recessed as at 22 for a purpose to be hereafter set forth. The member 10 is provided with a plurality of longitudinally spaced laterally projecting ears 23 and 24, the former having threaded openings 25 extending inwardly from their outer ends and the latter ears 24 having openings 26 extending transversely therethrough and through the side flanges 11.

A substantially U-shaped frame member 27 having side legs 28 and a connecting bight 29 is provided for adjustable association with the stationary member 10. The bight 29 is provided with an inwardly projecting annular sleeve 30 which is preferably formed as an integral part of the bight and the diameter of which is appropriate to be received between the annular boss and teeth of a differential gear A secured in the usual manner to the inner end of its axle section S. The bight 29 is provided with a central longitudinally extending threaded bore 31 which receives the threaded shank of a screw 32 provided with a multi-faced manipulating head 33 at its outer end and a conical or pointed extremity 34 at its inner end. The side legs 28 of the member 27 are provided with a plurality of longitudinally spaced openings 35 which are adapted to be brought into registry with the threaded openings 25 in the ears 23 or the openings 26 in the ears 24. Stud bolts 36 are inserted through the openings 35 and engaged in the openings 25 of the ears 23 and bolts 37 are inserted through certain of the openings 35 and openings 26 and ears 24 after which nuts 38 are applied. It thus follows that upon longitudinal adjustment of the member 27 with respect to the member 10 as illustrated in dotted lines in Fig. 2 the tool may be employed in connection with shafts S of practically any standard length. However in order to render the tool operative when extended a supporting plate 40 is employed which is provided with side legs 41 having apertures 42 which are alined with certain of the apertures 35 and which receive therethrough bolts 43. The plate 40 is provided with a central opening 44 with which a plurality of key slots 45 communicate whereby a stop element for the gear A is provided when shifting the shaft or axle S axially in a direction to remove the gear from the same.

In the ordinary use of the tool for the purpose of removing the gear A from the axle or shaft S the said shaft or axle S is positioned in the bearing recesses 18 with the collar C of the gear positioned against the flange 12 at the head end of the member 10. The retaining clip members 20 are then arranged in place by inserting the legs 19 in the openings at the opposite sides of the bearing recesses 18. The screw 16 is then manipulated to advance the pointed or conical inner extremity 17 against the outer extremity D of the axle section or shaft S and continued manipulation thereof will force the axle and gear to engage the groove between the teeth and hub of the gear against the inner end of the sleeve 30, after which the inner grooved extremity of the axle section will be forced beyond the outer end of the gear hub until the locking ring is displaced. The screw 16 is then retracted and the screw 32 is manipulated to advance the conical or pointed extremity 34 into engagement with the inner end of the axle, whereupon continued manipulation of the screw, the gear and axle will be advanced into engagement with the end flange 12 or the plate 40 if the device is extended. The axle is then turned to bring the key into registry with either of the grooves 45 if the device is extended or in cases where the device is not extended the key will register with the space between the portions 21. Further manipulation of the screw 32 will serve to force the inner end of the shaft from the gear. In use of the tool for effecting the application of the gear to the axle section, the operation is reverse.

In some instances where it is desired to use the tool as a brace in a vertical position, the stud screws 36 are removed and the U-shaped member 27 is turned to the vertical position illustrated in dotted lines in Fig. 1 using the bolts 37 as a pivot. In this instance the gear or other element to be removed from the shaft rests upon and is held against movement by the portions 21 while the screw 32 is advanced against the shaft to force the same from the gear or other element to which it is attached.

I claim:

1. A tool for effecting the connection and disconnection of a differential gear and axle section comprising a frame including means for supporting the axle section for axial movement, means at one end of the frame engageable with the gear for limiting the axial movement thereof in opposite directions, means movable through the opposite end of the frame and engageable with one extremity of the axle section for effecting relative axial movement of the same with respect to the gear in one direction whereby to permit of the disengagement and removal of the gear retaining means, and means movable through the first mentioned end of the frame and engageable with the opposite extremity of the axle section for effecting relative axial shifting movement of said axle section through the gear and the removal of the same therefrom, the said frame consisting of relatively longitudinally adjustable sections whereby to permit of use of the tool in connection with axles of various lengths.

2. A tool of the character set forth embodying a frame which includes relatively longitudinally adjustable members, elements carried by one of said frame members for supporting and associating an axle section therewith for axial movement longitudinally of the frame, an element at one extremity of the other frame section constituting together with the adjacent end of the other frame member means with which a gear on the axle section is adapted to engage for limiting longitudinal movements of the frame, and independent means respectively movable through the remote ends of the frame sections for engagement with the opposite ends of the axle to force and shift the same axially in opposite directions relative to the gear upon engagement of the gear with the means for limiting its movement.

3. In a tool of the character described, an elongated stationary member, an elongated relatively movable member adjustably associated with the stationary member, an annular boss extending inwardly from the movable member, means for supporting an axle on the stationary member in alinement with said boss and for axial sliding movement, means extending through said boss and a second means extending through the remote end of the stationary member for effecting relative movements of the axle in opposite directions with respect to a gear carried thereby, whereby to effect the connection or disconnection of the gear to the axle.

4. In a tool for effecting the connection and disconnection of a gear with an axle section, a stationary member including elements for supporting the axle section for axial movements longitudinally of said member, a substantially U-shaped adjustable member carried by the stationary member and having a bight provided with an inwardly projecting gear engaging element for limiting axial movement of the gear in one direction while permitting axial movement of the shaft in said direction, means at the adjacent end of the stationary member when the device is adjusted for axles of a minimum length with which said gear coacts to limit its movement in the opposite direction while permitting relative movement of the axle in said direction, means removably associated with the adjustable member adjacent its bight for supporting the axle and with which the gear coacts to limit its movement in the opposite direction and means extending respectively through the bight and through the remote end of the stationary member for effective relative movement of the axle in opposite directions.

5. In a tool for effecting the connection and disconnection of a gear with an axle section, a stationary member including elements for supporting the axle section for axial movements longitudinally of said member, a substantially U-shaped adjustable member carried by the stationary member and having a bight provided with an inwardly projecting gear engaging element for limiting axial movement of the gear in one direction while permitting axial movement of the shaft in said direction, means at the adjacent end of the stationary member when the device is adjusted for axles of a minimum length with which said gear coacts to limit its movement in the opposite direction while permitting relative movement of the axle in said direction, means removably associated with the adjustable member adjacent its bight for supporting the axle and with which the gear coacts to limit its movement in the opposite direction and means extending respectively through the bight and through the remote end of the stationary member for effecting relative movement of the axle in opposite directions, the said adjacent end of the stationary member provided with means on its upper face for supporting a gear, collar or other element carried by an axle or shaft whereby upon swinging of the movable member to a vertical position the means extending through the bight may be employed for depressing and forcing the axle or shaft from the gear, collar or the like.

WILLIAM C. BAKELS.